(12) United States Patent
Ohtomo et al.

(10) Patent No.: US 6,859,269 B2
(45) Date of Patent: Feb. 22, 2005

(54) SURVEYING INSTRUMENT AND METHOD FOR ACQUIRING IMAGE DATA BY USING THE SURVEYING INSTRUMENT

(75) Inventors: Fumio Ohtomo, Tokyo-to (JP); Hitoshi Otani, Tokyo-to (JP); Makoto Omori, Tokyo-to (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 0 days.

(21) Appl. No.: 10/387,874

(22) Filed: Mar. 13, 2003

(65) Prior Publication Data

US 2003/0179361 A1 Sep. 25, 2003

(30) Foreign Application Priority Data

Mar. 20, 2002 (JP) .......................... 2002-78862

(51) Int. Cl.[7] .................. G01B 11/26; G01B 11/24; G01C 1/00
(52) U.S. Cl. .................. 356/141.1; 356/612; 382/154
(58) Field of Search .............................. 356/141.1, 612; 382/154

(56) References Cited

U.S. PATENT DOCUMENTS 5,361,217 A * 11/1994 Makimura et al.
5,548,409 A * 8/1996 Ohta et al. ................... 386/117
5,988,862 A * 11/1999 Kacyra et al.
6,563,574 B2 * 5/2003 Ohtomo et al.

OTHER PUBLICATIONS

3rdTech; DeltaSphere–3000 Brochure; Jun. 22, 2000.*

* cited by examiner

Primary Examiner—Bernarr E. Gregory
Assistant Examiner—Brian K Andrea
(74) Attorney, Agent, or Firm—Nields & Lemack (57) ABSTRACT

A surveying instrument, comprising a distance measuring unit for measuring a distance to a collimating point, an angle measuring unit for measuring a vertical angle and a horizontal angle of the collimating point, an image pick-up means for acquiring an image in a collimating direction, a driving unit for directing the image pick-up means in a direction of a predetermined object to be measured as selected based on an entire image data acquired by the image pick-up means, and a control arithmetic unit for recording by associating an image of an object to be measured with survey data to the object, wherein the image is picked-up in the direction directed by the driving unit and the survey data is measured by the distance measuring unit and the angle measuring unit.

6 Claims, 7 Drawing Sheets

SURVEYING INSTRUMENT AND METHOD FOR ACQUIRING IMAGE DATA BY USING THE SURVEYING INSTRUMENT

BACKGROUND OF THE INVENTION

The present invention relates to a surveying instrument, particularly to a survey instrument capable of recording an image data of a target object and a distance data of the target object by associating these data with each other, and the invention also relates to a method for acquiring an image data by using the surveying instrument.

In recent years, for the purpose of acquiring map information, it has been necessary to acquire, not only surveying data of a target point, but also an image of the target point. Thus, it is now practiced to acquire the surveying data and to take and record the image of the target point.

However, in the conventional method, a target object is determined, and general surveying operation is performed on the target object. In addition to the general surveying operation, the image of the target object is taken by means such as an electronic camera. In this respect, there is disadvantages such that it is troublesome to perform surveying operation on the target object and to take images on or around the target object. Also, it is very difficult to associate the surveying data with the images thus taken.

SUMMARY OF THE INVENTION

It is an object of the present invention to overcome the disadvantages of the prior art and to provide a surveying instrument and a method for acquiring image data by using the surveying instrument, by which it is possible to easily carry out a series of surveying operation and image taking operation, to record by associating the surveying data of the target object with the images thereof, and to obtain information which can be efficiently utilized in subsequent operations such as preparation of 3-dimensional models of scenery of cities and towns.

To attain the above object, the present invention provides a surveying instrument, which comprises a distance measuring unit for measuring a distance to a collimating point, an angle measuring unit for measuring a vertical angle and a horizontal angle of the collimating point, an image pick-up means for acquiring an image in a collimating direction, a driving unit for directing the image pick-up means in a direction of a predetermined object to be measured as selected based on an entire image data acquired by the image pick-up means, and a control arithmetic unit for recording by associating an image of an object to be measured with survey data to the object, wherein the image is picked-up in the direction directed by the driving unit and the survey data is measured by the distance measuring unit and the angle measuring unit. Also, the present invention provides the surveying instrument as described above, wherein the entire image is formed by synthesizing two or more images in different directions. Further, the present invention provides the surveying instrument as described above, wherein the image pick-up means comprises a first image pick-up means for picking up the image in the collimating direction of the distance measuring unit and a second image pick-up means having a narrower field of view than the first image pick-up means, and a synthesized image is prepared based on two or more images acquired by the first image pick-up means. Also, the present invention provides the surveying instrument as described above, wherein there is provided another independent image pick-up means, an image of a portion where the image is lacking in the image being acquired by the image pick-up means is acquired, and the control arithmetic unit complements the image-lacking portion of the image pick-up means by the image of the another image pick-up means and prepares a synthesized image. Further, the present invention provides the surveying instrument as described above, wherein there is further provided a GPS which acquires a positional data of the object to be measured, and the positional data of the object to be measured, a positional data for acquiring the image, and the image data are acquired by associating with each other. Also, the present invention provides the surveying instrument as described above, wherein the image pick-up means is accommodated in a telescope unit, the telescope unit is rotatably mounted in a vertical direction on a frame unit, the frame unit is arranged rotatably in a horizontal direction, there are provided a vertical driving unit for rotating the telescope unit in the vertical direction and a horizontal driving unit for rotating the frame unit in the horizontal direction, and two or more images incorporated by sequentially changing the collimating direction of the telescope unit are synthesized.

Also, the present invention provides a method for acquiring image data by using a surveying instrument as described above, wherein the method comprises a step of acquiring a predetermined entire image, a step of acquiring an image around an object to be measured as selected based on the entire image thus acquired, a step of performing position surveying of the object to be measured corresponding to the image, and a step of acquiring each of the images and positional data by associating with each other. Further, the present invention provides the method for acquiring image data by using the surveying instrument of the present invention as described above, wherein the entire image is a synthesized image formed by synthesizing two or more images in different directions. Also, the present invention provides the method for acquiring image data by using the surveying instrument of the present invention as described above, wherein the method comprising a step of acquiring images of an object from two or more known points, a step of performing position surveying between the known point and the object on each of the acquired images, a step of associating the acquired image with positional data and of performing data conversion of images based on positional data between the known points, and a step of performing the synthesizing of the two or more image thus acquired.

DETAILED DESCRIPTION OF THE PREFERRED EMBODIMENTS

Description will be given below on embodiments of the present invention referring to the drawings.

Figure 1:
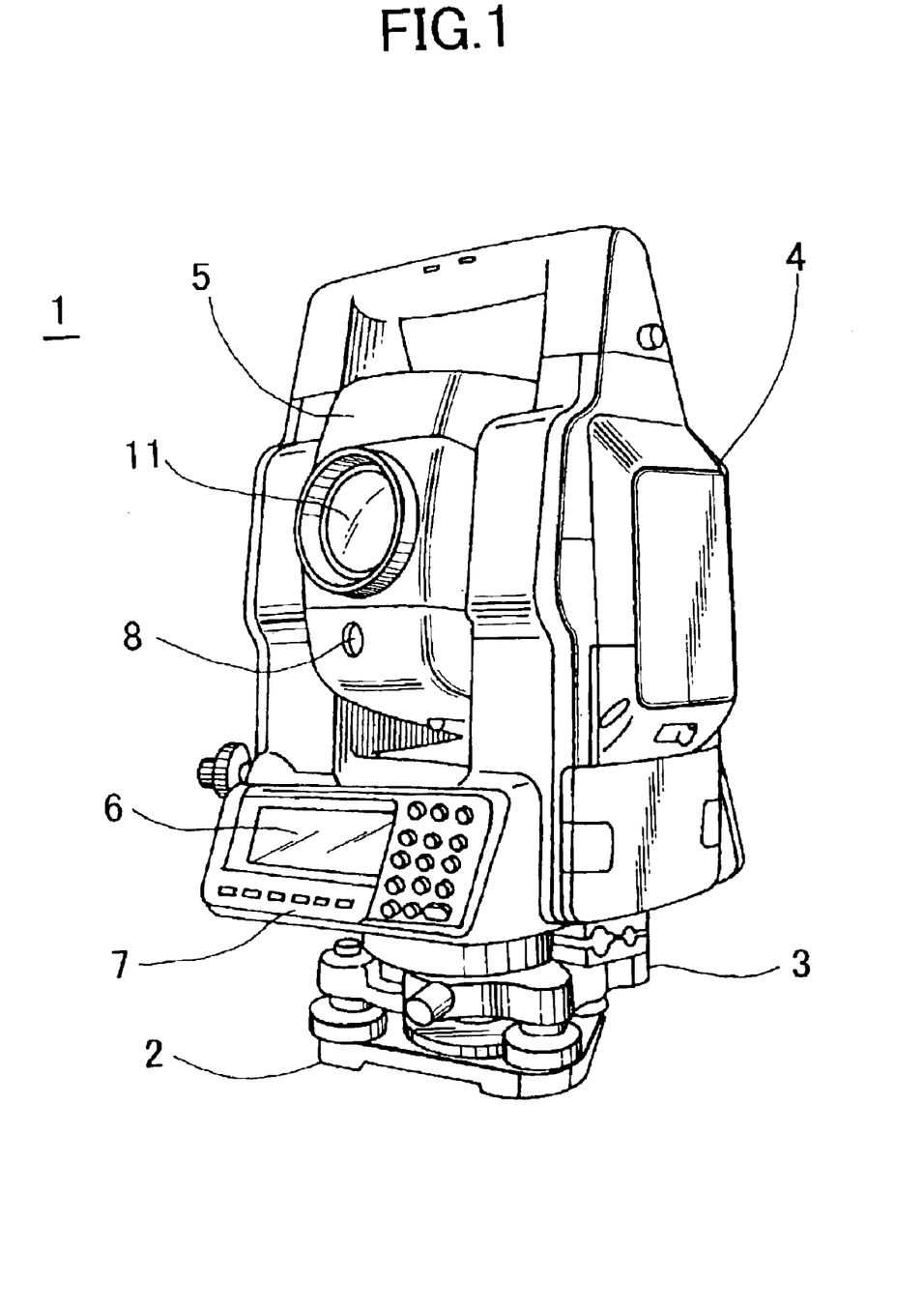
FIG. 1 is an external view of a surveying instrument according to an embodiment of the present invention.

First, description will be given on a surveying instrument according to a first embodiment of the invention referring to FIG. 1. FIG. 1 shows a main unit 1 of the survey instrument.

The main unit 1 primarily comprises a leveling unit 2 mounted on a tripod (not shown), a base unit 3 provided on the leveling unit 2, a frame unit 4 mounted on the base unit 3 so that the frame unit 4 can be rotated around a vertical axis, and a telescope unit 5 mounted on the frame unit 4 so that the telescope unit 5 can be rotated around a horizontal axis.

The frame unit 4 comprises a display unit 6 and an operation unit 7. The telescope unit 5 comprises a second telescope 11 for collimating an object to be measured, and a second image pick-up unit 12 (to be described later) for picking up an image collimated by the second telescope 11. Further, the frame unit 4 comprises a first image pick-up unit 9 (to be described later) having an optical axis in parallel to the second telescope 11 and for picking up a wider image than the second image pick-up unit 12 in a collimating direction. The first image pick-up unit 9 includes a first telescope 8, which has a wider field of view than the second telescope 11.

Now, description will be given on an optical system referring to FIG. 2.

Figure 2:
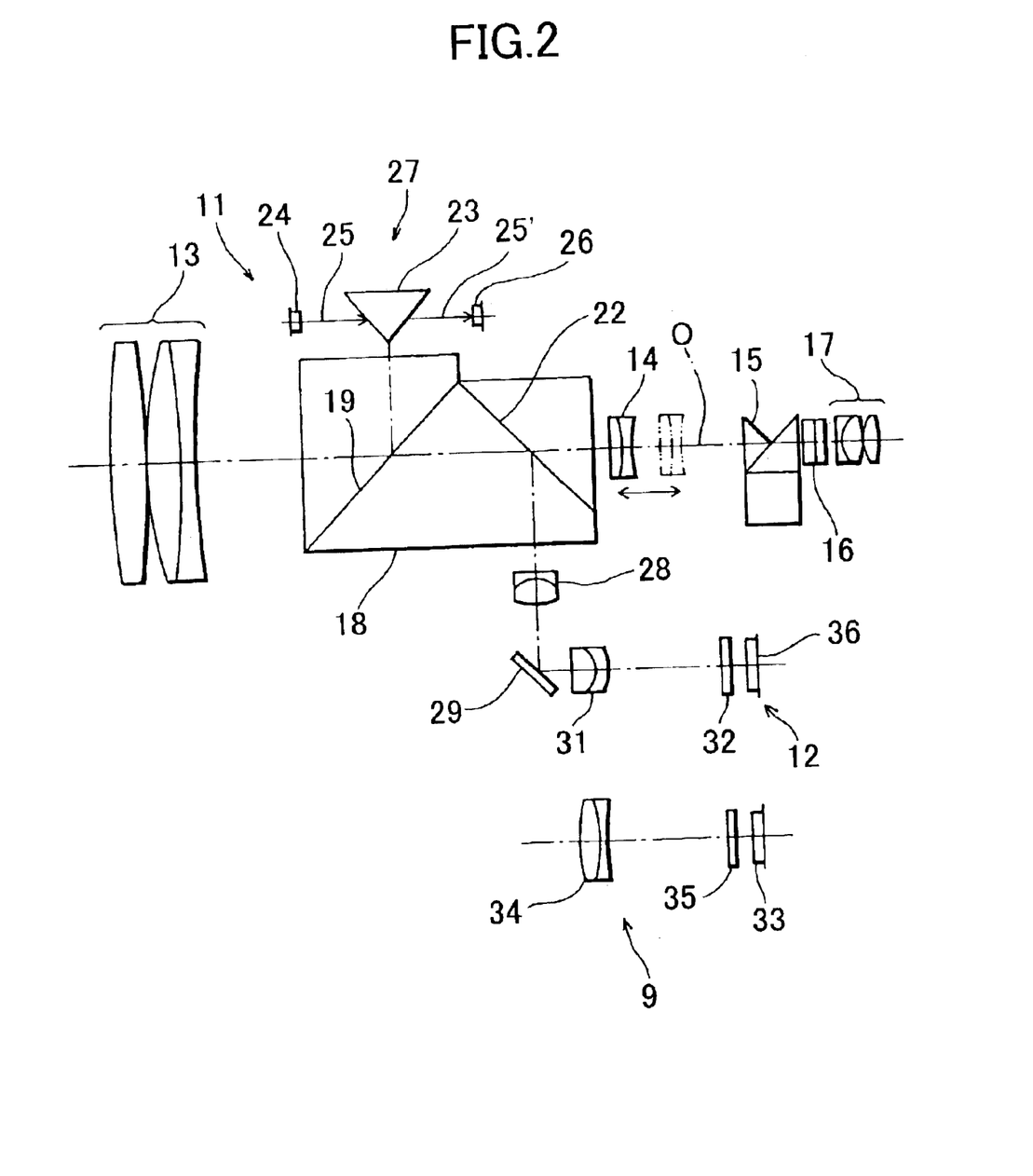
FIG. 2 is a block diagram of an optical system of a first embodiment of the present invention.

In FIG. 2, an objective lens 13, a focusing lens 14, an erect prism 15, a focusing mirror 16, and an eyepiece lens 17 are arranged sequentially on an optical axis O. An optical means, preferably a dichroic prism 18, is arranged between the objective lens 13 and the focusing lens 14. The dichroic prism 18 has a first mirror surface 19 for reflecting a distance measuring light (which is an invisible light) and for allowing a visible light to pass, and a second mirror surface 22 for allowing a part of the visible light to pass toward the objective lens 17 and for reflecting the remainder of the visible light toward the second image pick-up unit 12.

The objective lens 13, the focusing lens 14, the eyepiece lens 17, etc. make up together the second telescope 11.

The first mirror surface 19 allows the visible light of 400–650 nm to pass, for instance, and the first mirror surface 19 reflects infrared light of 650–850 nm.

A triangular mirror 23 facing toward the first mirror surface 19 is provided. A projected distance measuring light 25 emitted from a light emitter 24 is projected toward the first mirror surface 19 via the triangular mirror 23. The projected distance measuring light 25 is reflected further by the first mirror surface 19 and is projected to an object to be measured 21 (to be described later) via the objective lens 13. A reflected distance measuring light 25' entering from the object to be measured 21 through the objective lens 13 is reflected by the first mirror surface 19 and the triangular mirror 23 and is received by a photodetection unit 26.

A distance measuring unit 27 comprising the triangular mirror 23, the light emitter 24 and the photodetection unit 26 measures a distance to the object to be measured 21 based on a phase difference between a light wave of the projected distance measuring light 25 and a light wave of the reflected distance measuring light 25'. A distance measuring optical system and a distance measuring circuit of the distance measuring unit 27 are the same as those of the conventional type surveying instrument, and the distance measuring optical system and the distance measuring circuit are neither described in detail here nor shown in the figure.

The second image pick-up unit 12 and the second mirror surface 22 are both provided on the telescope unit 5. Now, description will be given on the second image pick-up unit 12.

The visible light divided by the second mirror surface 22 passes through a band-pass filter 32 (which allows only the visible light to pass) via a relay lens 28, a reflection mirror 29, and a relay lens 31, and an image is formed on a second image pick-up element 36.

The first image pick-up unit 9 has an optical axis in parallel to the second telescope 11. An objective lens 34 is arranged on the optical axis. A light beam converged by the objective lens 34 passes through a band-pass filter 35 (which allows only the visible light to pass), and an image is formed on a first image pick-up element 33. An image sensor is used as each of the first image pick-up element 33 and the second image pick-up element 36.

Figure 3:
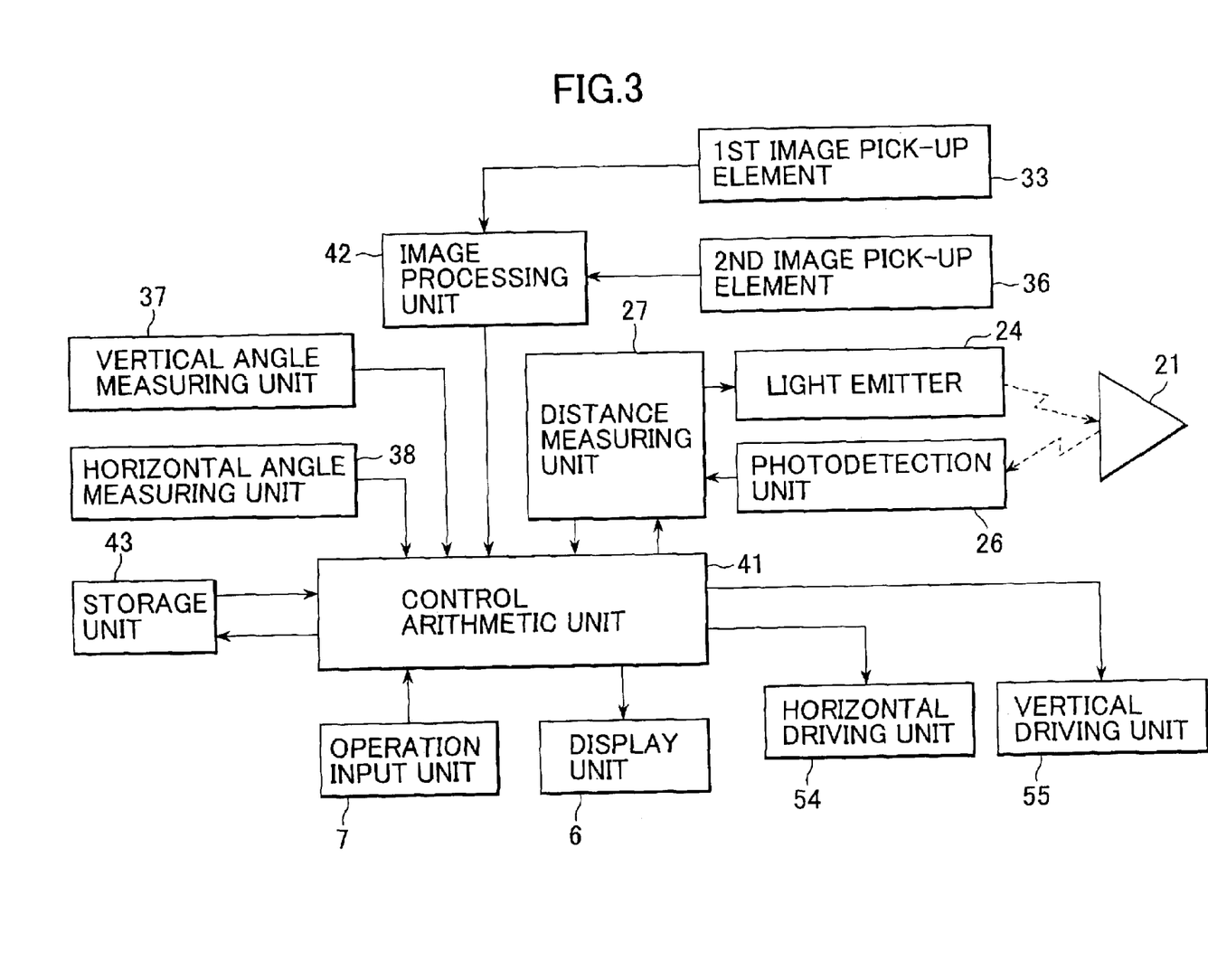
FIG. 3 is a basic block diagram of the first embodiment.

Referring to FIG. 3, description will be given below on basic arrangement of the main unit 1.

A vertical angle measuring unit 37 for detecting a vertical angle of the telescope unit 5 and for measuring a vertical angle in a collimating direction is provided on the frame unit 4. Also, a horizontal angle measuring unit 38 is provided, which detects a rotation angle of the frame unit 4 with respect to the base unit 3 and detects a horizontal angle in the collimating direction. Further, a control device, comprising a control arithmetic unit 41, an image processing unit 42, a storage unit 43, etc. is incorporated in the frame unit 4.

A calculation program required for surveying operation or an image processing program required for acquisition of image information (to be described later) are accommodated in the storage unit 43. The results of measurement from the distance measuring unit 27, the vertical angle measuring unit 37, and the horizontal angle measuring unit 38 are inputted to the control arithmetic unit 41, and surveying operation such as distance measurement, or surveying of an angle of elevation or a horizontal angle is performed, and the results of surveying are displayed on the display unit 6.

Further, a horizontal driving unit 54 for rotating the frame unit 4 in a horizontal direction and a vertical driving unit 55 for rotating the telescope unit 5 in a vertical direction are provided. The horizontal driving unit 54 and the vertical driving unit 55 are controlled by the control arithmetic unit 41.

Surveying operation, etc. by the present surveying instrument is the same as that of the conventional type surveying instrument, and detailed description is not given here. In the following, description will be given on operation when the image data is acquired as a map information, referring to FIG. 4.

Figure 4:
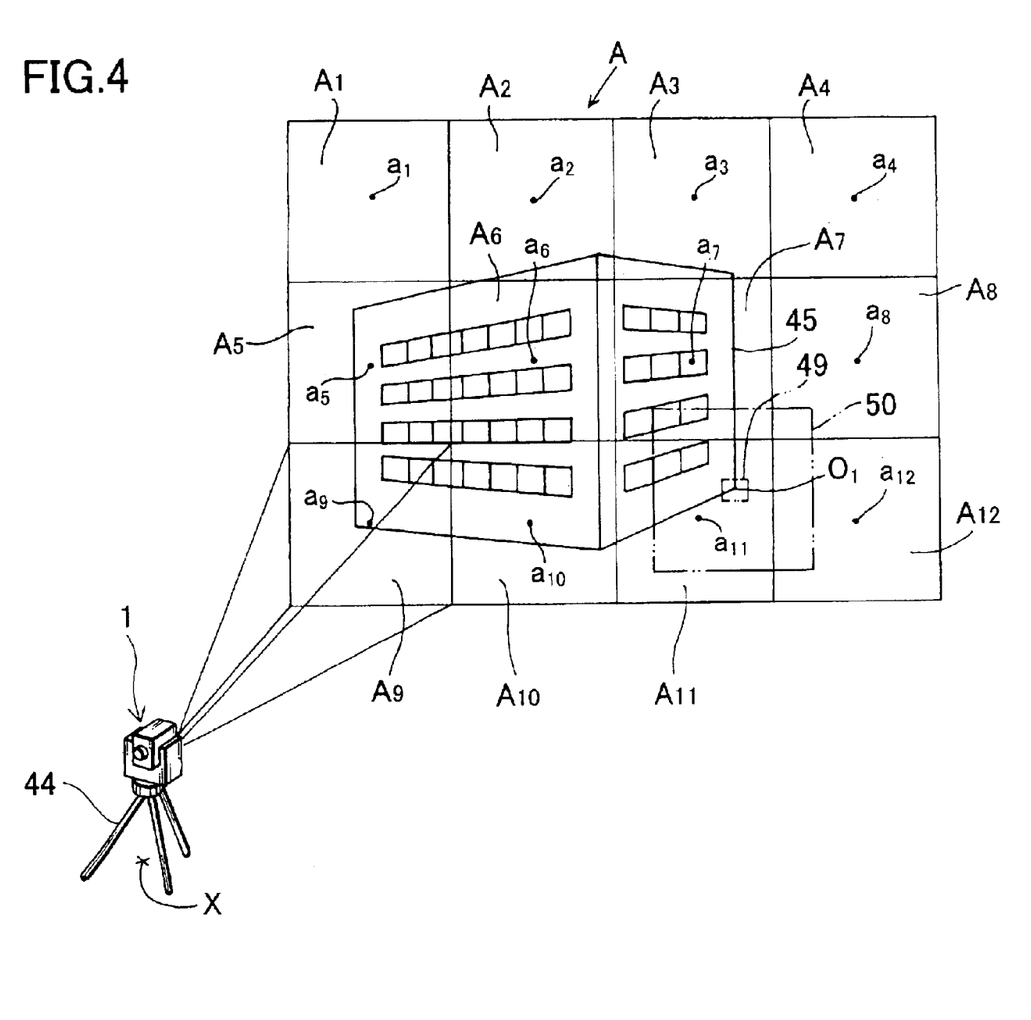
FIG. 4 is a drawing to explain operation for acquiring image data in the present invention.

The main unit 1 is installed at a known point via a tripod 44, and positional data of the known point is inputted from the operation unit 7. The positional data of the known point thus inputted is stored in the storage unit 43 via the control arithmetic unit 41. Next, in order to acquire an entire image in a wide field of view, the main unit 1 is directed to a construction 45 such as a building, used as a target, for instance. Then, an instruction is given by the operation unit 7 so as to acquire the entire image. According to the instruction, the control arithmetic unit 7 sequentially changes the central direction of the telescope unit 5 to directions a1–a12 based on signals from the vertical angle measuring unit 37 and the horizontal angle measuring unit 38. Collimation is performed by using the first telescope 8 with a wider field of view at each central position, and images A1–A12 are respectively acquired by the first image pick-up element 33.

The changing of the angle in the central direction of the telescope unit 5 is determined according to an angle of view of the telescope 8 so that each of the images A1–A12 can be continuously acquired.

The images A1–A12 thus acquired are incorporated into the image processing unit 42 via the first image pick-up element 33. The control arithmetic unit 41 synthesizes each of the incorporated images A1–A12. An entire synthesized image A is prepared, and the entire synthesized image A is displayed on the display unit 6.

The entire synthesized image A thus displayed is an entire image generally including the construction 45, which is regarded as the target. A surveyor observes the entire synthesized image A. By moving a cursor on the display unit 6, an object to be measured O1 (a collimating point) is selected.

When the object to be measured O1 is selected, the image processing unit 42 calculates a horizontal angle and a vertical angle of the object to be measured O1. The control arithmetic unit 41 automatically controls the horizontal driving unit 54 and the vertical driving unit 55 in order to direct the telescope 5 to face approximately to that direction. Then, the surveyor determines the collimating direction accurately to the object to be measured O1 by using the telescope 11, which has narrower field of view. The collimating direction is measured by the vertical angle measuring unit 37 and the horizontal angle measuring unit 38. Further, the distance is measured by the distance measuring unit 27.

After the measurement is completed, a precise image 49 around the object is acquired by the second image pick-up element 36 with the object to measured O1 as the center. Then, a wide angle image 50 in wide range around the object to be measured O1 is acquired by the first image pick-up element 33. These images 49 and 50 are recorded in association with angle-measuring data measured by the vertical angle measuring unit 37 and the horizontal angle measuring unit 38 and also with distance measurement data measured by the distance measuring unit 27.

Similarly, when another object to be measured O2 (not shown) is selected based on the entire synthesized image A, a horizontal angle and a vertical angle of the object to be measured O2 are calculated in a manner similar to the case of the object to be measured O1. The control arithmetic unit 41 automatically controls the telescope unit 5 in that direction. A collimating direction is measured by the vertical angle measuring unit 37 and the horizontal angle measuring unit 38. Further, the distance is measured by the distance measuring unit 27, and a precise image and a wide angle image relating to the object to be measured O2 are acquired. The images and measurement data of the object to be measured O2 are recorded in association with each other in the same manner as described above.

The data of the known point X, the survey data of the target with respect to the known point X, and the image of the target from the known point X are corresponded with each other, and these are recorded in the storage unit 43.

Figure 5:
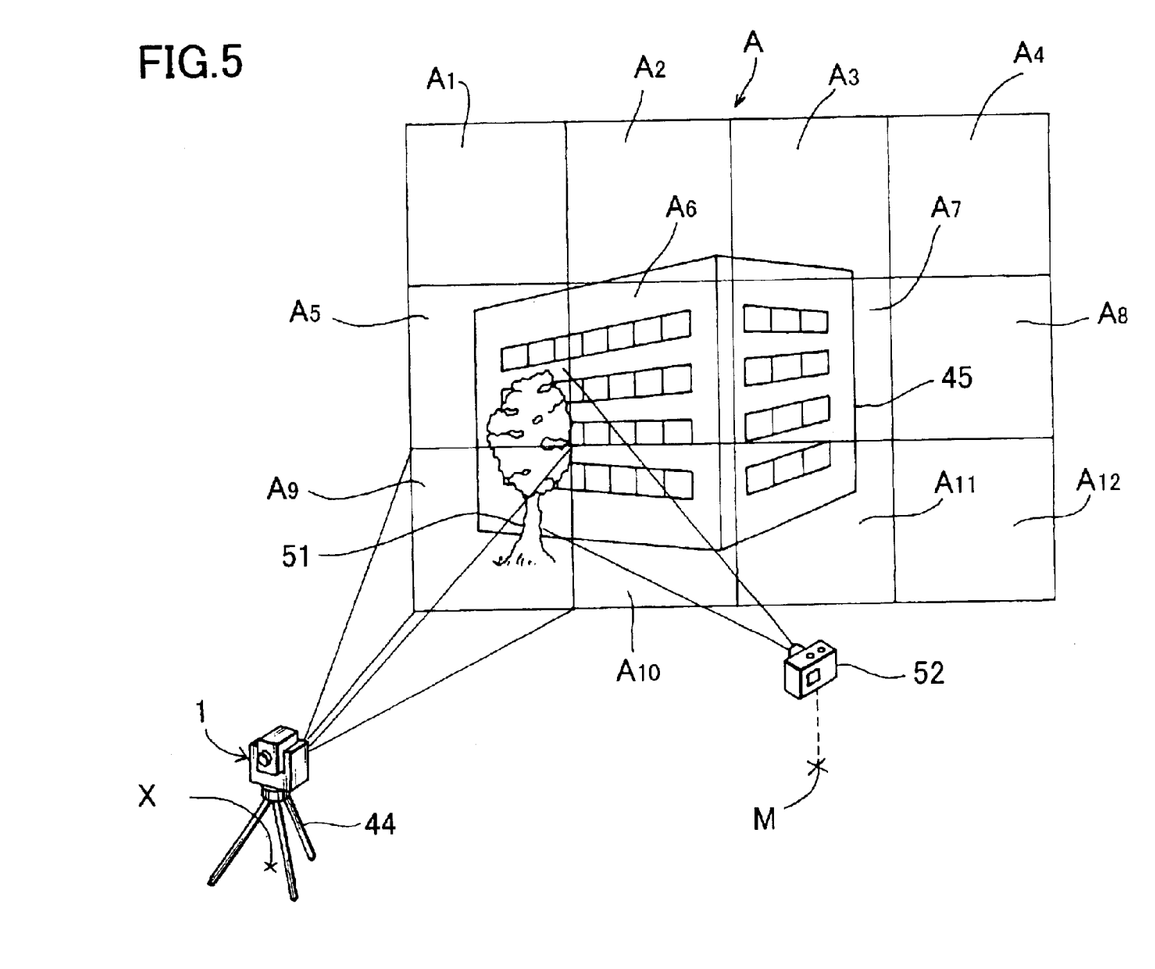
FIG. 5 is a drawing to explain operation for acquiring image data in the present invention.

Next, referring to FIG. 5, description will be given on acquisition of image data in a case where there is an obstacle, e.g. a tree 51, between the main unit 1 and the construction 45.

A point M is selected, from which a portion behind the tree 51 concealed by the tree 51 can be seen. Then, measurement is made by the main unit 1 on a distance between the point M and the known point X and a direction from the known point X to the point M. A complementary image data of the portion concealed by the tree 51 is acquired from the point M using a third image pick-up means, e.g. a digital camera 52. The complementary image data is recorded on a readable storage medium, e.g. a memory card, by the main unit 1.

The complementary image data is recorded in the storage unit 43 from the operation unit 7 via the control arithmetic unit 41. At the control arithmetic unit 41, the complementary image data is converted to an image seen from the direction of the known point X by data conversion such as affine transformation (coordinate transformation), Helmert transformation (uniaxial transformation). Further, the complementary image data is synthesized to the entire synthesized image A. The lacking portion due to the shadow of the tree 51 is complemented, and an entire synthesized image of the construction 45 is acquired with the tree 51 erased.

Figure 6:
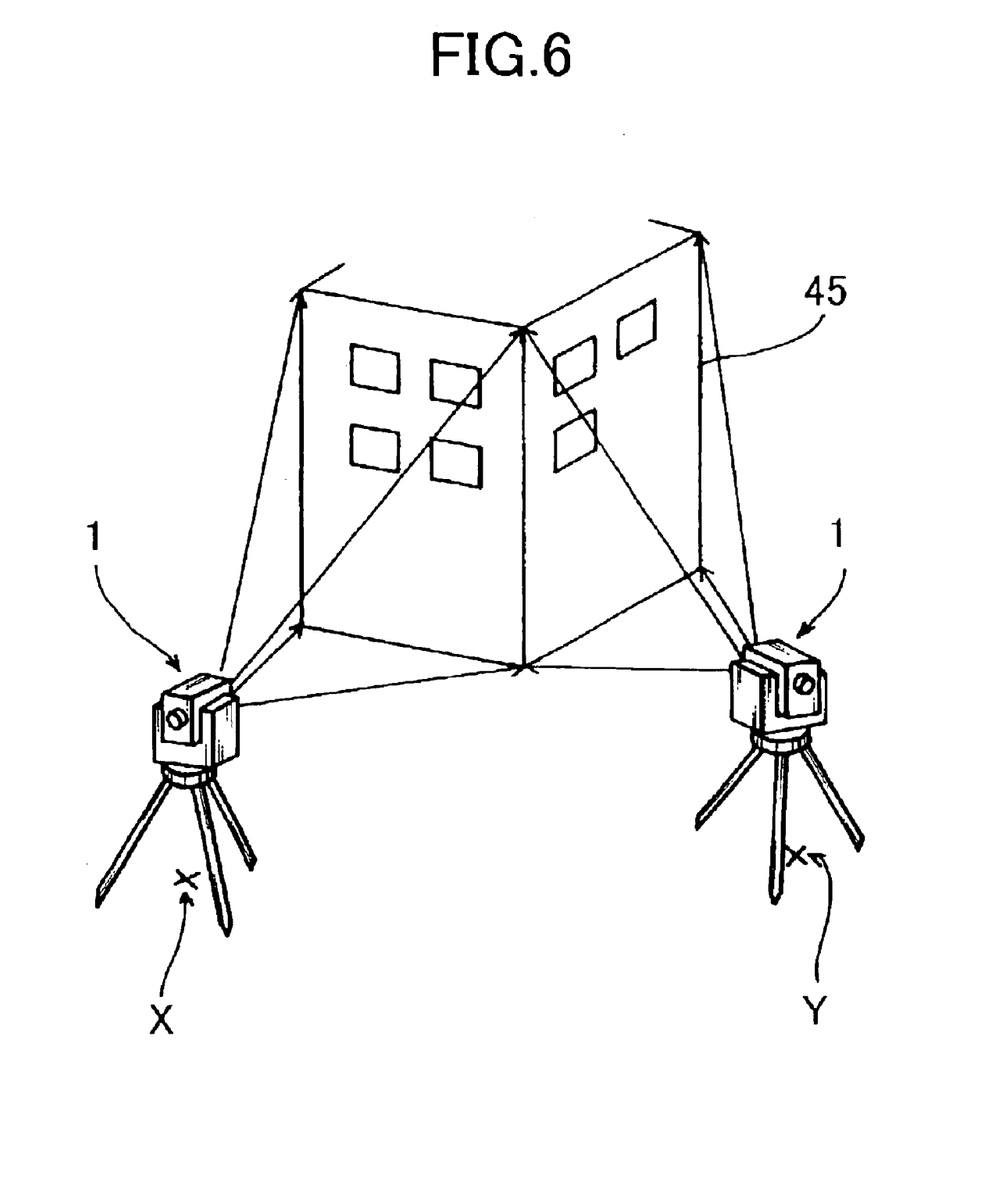
FIG. 6 is a perspective view to explain another example of acquiring the image data according to the present invention.

FIG. 6 shows how image data from two or more directions of a target object such as the construction 45 is acquired. For instance, FIG. 6 shows a case where the image data is acquired from two directions. Known points X and Y are set, and a surveying instrument is installed at each of the known points X and Y. The operation may be performed at the same time using two or more surveying instruments, or the image data may be sequentially acquired by moving a single surveying instrument.

The procedure to acquire individual image data is the same as described above, and detailed description is not given here.

By acquiring the image data of the construction 45 from two or more directions, more complete 3-dimensional image data can be acquired.

Figure 7:
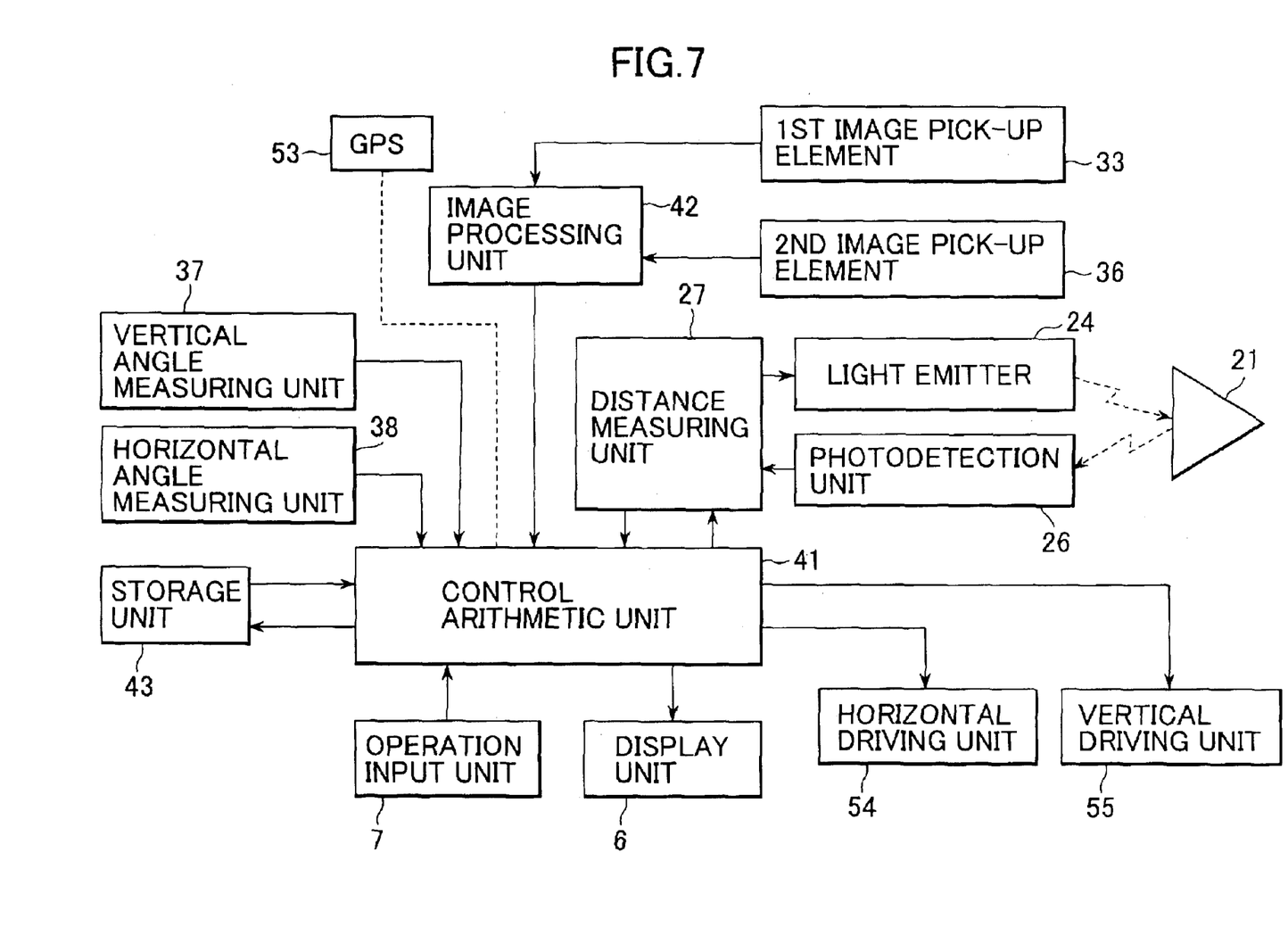
FIG. 7 is a basic block diagram showing a second embodiment of the present invention.

FIG. 7 represents a second embodiment of the invention.

In the second embodiment, a GPS 53 is provided. Based on a signal from a satellite, an absolute position of the main unit 1 can be measured. Further, the horizontal driving unit 54 for rotating the frame unit 4 in a horizontal direction and the vertical driving unit 55 for rotating the telescope unit 5 in a vertical direction are provided. This makes it possible to more easily acquire the image data.

In the first embodiment as described above, the data of the known point is inputted from the operation unit 7. In the second embodiment, positional data can be acquired by measuring with the GPS 53. Thus, there is no need to input the data. After installing the main unit 1 at any position as desired, the operation to acquire the image data can be immediately started.

The present invention provides a surveying instrument, which comprises a distance measuring unit for measuring a distance to a collimating point, an angle measuring unit for measuring a vertical angle and a horizontal angle of the collimating point, an image pick-up means for acquiring an image in a collimating direction, a driving unit for directing the image pick-up means in a direction of a predetermined object to be measured as selected based on an entire image data acquired by the image pick-up means, and a control arithmetic unit for recording by associating an image of an object to be measured with survey data to the object, wherein the image is picked-up in the direction directed by the driving unit and the survey data is measured by the distance measuring unit and the angle measuring unit. As a result, on the object to be measured, general surveying operation and acquisition of the image data relating the object to be measured can be performed at the same time. The procedure to correspond the survey data with the image of the object to be measured can be reliably carried out, and this contributes to higher efficiency in handling the acquired data.

What is claimed is:

1. A surveying instrument, comprising a distance measuring unit for measuring a distance to a collimating point, an angle measuring unit for measuring a vertical angle and a horizontal angle in a collimating direction, an image pick-up means for acquiring an image in the collimating direction, a driving unit for directing said image pick-up means in a predetermined direction, and a control arithmetic unit which acquires partial images by partitioning a predetermined range including a target using said image pick-up means, synthesizes the partial images to an entire image, selects an object to be measured within the entire image, calculates a horizontal angle and a vertical angle of the selected object to be measured, and controls said driving unit based on the horizontal angle and the vertical angle, and directs the collimating direction toward the object to be measured, wherein a precise image having the object to be measured as the center is acquired, and the precise image is recorded in associating with survey data which is measured by said distance measuring unit and said angle measuring unit with respect to the object to be measured.

2. A surveying instrument according to claim 1, wherein there is provided a display unit for displaying the acquired image, wherein an image of the object to be measured is acquired and distance measurement and angle measurement are performed by sequentially selecting the object to be measured on the entire image.

3. A surveying instrument according to claim 1, wherein said image pick-up means comprises a first image pick-up means which has a wide angle of view for picking up the image in the collimating direction of said distance measuring unit and a second image pick-up means which has a narrower angle of view than said first image pick-up means for picking up the image around the object to be measured, and the entire image is synthesized based on the partial images acquired by said first image pick-up means.

4. A surveying instrument according to claim 1, wherein there is provided a second independent image pick-up means, a second image of a portion where the image is lacking in the first image being acquired by said image pick-up means is acquired by said second independent image pick-up means, and wherein said control arithmetic unit complements the image-lacking portion of the first image by inserting said second image and synthesizing the entire image.

5. A surveying instrument according to claim 1, wherein there is provided a GPS which measures an absolute position of a main unit, and the positional data of the object to be measured, a positional data for acquiring the image, and the image data are recorded based on said absolute position.

6. A method for acquiring image data by using a surveying instrument which comprises a distance measuring unit for measuring a distance to a collimating point, an angle measuring unit for measuring a vertical angle and a horizontal angle in the collimating direction, an image pick-up means for acquiring an image in the collimating direction and a driving unit for directing said image pick-up means in a predetermined direction, said method comprising a step of acquiring partial images by partitioning a predetermined range including a target using said image pick-up means, a step of synthesizing the partial images to an entire image, a step of selecting an object to be measured within the entire image, a step of calculating a horizontal angle and a vertical angle of the selected object to be measured, a step of controlling said driving unit based on the horizontal angle and the vertical angle and directing the collimating direction toward the object to be measured, a step of acquiring a precise image having the object to be measured as the center, and a step of recording the precise image in association with survey data which is measured by said distance measuring unit and said angle measuring unit with respect to the object to be measured.

\* \* \* \* \*